(12) United States Patent
Schick et al.

(10) Patent No.: US 8,743,202 B2
(45) Date of Patent: Jun. 3, 2014

(54) STEREO CAMERA FOR A MOTOR VEHICLE

(75) Inventors: Jens Schick, Herrenberg (DE); Andreas Schmack, Leonberg (DE); Steffen Fritz, Wurmberg (DE)

(73) Assignee: Robert Bosch GmbH, Stuttgart (DE)

( * ) Notice: Subject to any disclaimer, the term of this patent is extended or adjusted under 35 U.S.C. 154(b) by 1721 days.

(21) Appl. No.: 11/794,015

(22) PCT Filed: Nov. 21, 2005

(86) PCT No.: PCT/EP2005/056100
§ 371 (c)(1),
(2), (4) Date: Oct. 29, 2007

(87) PCT Pub. No.: WO2006/069854
PCT Pub. Date: Jul. 6, 2006

(65) Prior Publication Data
US 2008/0199069 A1   Aug. 21, 2008

(30) Foreign Application Priority Data
Dec. 23, 2004   (DE) .......................... 10 2004 061 998

(51) Int. Cl.
*H04N 7/18* (2006.01)
*G06K 9/00* (2006.01)

(52) U.S. Cl.
USPC ........................................ 348/148; 382/154

(58) Field of Classification Search
CPC ............ H04N 13/0239; H04N 13/025; H04N 13/0257
USPC ........................................ 348/148; 382/154
See application file for complete search history.

(56) References Cited

U.S. PATENT DOCUMENTS

| 5,650,944 | A | 7/1997 | Kise |
| 6,690,451 | B1* | 2/2004 | Schubert ...................... 356/3.14 |
| 7,965,336 | B2* | 6/2011 | Bingle et al. .................. 348/374 |
| 2002/0130953 | A1* | 9/2002 | Riconda et al. ............... 348/115 |
| 2003/0076688 | A1* | 4/2003 | Kobayashi ..................... 362/510 |
| 2005/0151671 | A1* | 7/2005 | Bortolotto ...................... 340/936 |
| 2006/0250224 | A1* | 11/2006 | Steffel et al. .................. 340/435 |

FOREIGN PATENT DOCUMENTS

| DE | 43 25 542 | 2/1995 |
| DE | 102 04 128 | 8/2003 |
| DE | 102 19 788 | 11/2003 |
| EP | 0 454 516 | 10/1991 |
| EP | 0 896 267 | 2/1999 |
| EP | 1 028 387 | 8/2000 |

OTHER PUBLICATIONS

International Search Report, PCT International Patent Application No. PCT/EP2005/056100, dated Mar. 3, 2006.

\* cited by examiner

*Primary Examiner* — David X Yi
(74) *Attorney, Agent, or Firm* — Kenyon & Kenyon LLP

(57) ABSTRACT

A device is described for a motor vehicle, having at least one first camera and at least one second camera, the first camera and the second camera acting as a stereo camera, the first camera and the second camera being different with respect to at least one camera property, in particular the light sensitivity of the first camera and the light sensitivity of the second camera being different. Furthermore the device is configured in such a way that the driver assistance function of night vision support and/or traffic sign recognition and/or object recognition and/or road boundary recognition and/or lane recognition and/or other functions are ensured.

12 Claims, 1 Drawing Sheet

STEREO CAMERA FOR A MOTOR VEHICLE

FIELD OF THE INVENTION

The present invention relates to a device for a motor vehicle, having a first camera and a second camera, the first camera and the second camera acting as a stereo camera.

BACKGROUND INFORMATION

Automotive manufacturers have a number of future-oriented video camera functions such as night vision support as a night vision system, lane recognition, object recognition or traffic sign recognition in the planning stage. For some of these functions, stereo cameras are particularly suitable.

German Patent Application No. DE 102 19 788 C1 describes a method and a device for measuring the range of vision using an image sensor system in a motor vehicle, the image sensor system here having at least two image sensors that record generally the same scene but at slightly different angles of view. There is no reference here to a stereo camera having two cameras that differ with regard to optical design and/or optical properties and/or electrical properties.

German Patent Application No. DE 102 04 128 A1 describes a device for rollover detection of a vehicle having a stereo camera in the direction of travel. Furthermore, German Patent Application No. DE 102 04 128 A1 describes using the stereo camera for other purposes, such as night vision (night vision support), traffic sign recognition, lane departure warning, lane course recognition and/or precrash sensing. There is no reference here to a stereo camera having two cameras that are different with respect to the optical design and/or optical properties and/or electrical properties.

SUMMARY

In accordance with an example embodiment of the present invention, a device is provided for a motor vehicle having at least one first camera and at least one second camera, which record generally the same scene and/or act as a stereo camera. This may be advantageous in that two or more applications, in particular driver assistance functions, are implementable with more optimal efficiency on the basis of the images of a first camera and a second camera than is the case with a traditional symmetrical stereo camera. Advantageously only minor effort is necessary to adapt the image data for stereo analysis. Therefore, the functionality of the stereo camera application is advantageously generally not influenced by the stereo camera, which is asymmetrical in at least one camera property. Furthermore, it may be particularly advantageous that at least one special camera property of one or both cameras may be used for both applications, in particular driver assistance functions. The difference in light sensitivity and/or dark sensitivity of the first and second cameras contributes in a particularly advantageous manner to the fact that in addition to the other driver assistance functions such as traffic sign recognition and/or object recognition and/or road boundary recognition and/or lane recognition and/or other functions, in particular drive functions, the driver assistance function of night vision support is implementable at low cost.

A black-and-white camera is advantageous as the first camera. For many driver assistance functions, even with non-image-reproducing functions, black-and-white cameras offer advantages due to their low price and high image quality in comparison with color cameras. Therefore, use of a black-and-white camera, e.g., the combination of a color camera and a black-and-white camera, which together act as a stereo camera, contributes toward making the device inexpensive.

It may be particularly advantageous if the second camera is a color camera, because the driver assistance function of traffic sign recognition may be made available particularly reliably to the driver in an advantageous manner through the color camera because traffic sign recognition based on color images may be implemented in a particularly reliable manner. Furthermore, the color camera contributes toward expansion of the driver assistance function of night vision support in an advantageous manner by supplementing the black-and-white night vision image with a color image, for example.

A device for a motor vehicle having at least one first camera and at least one second camera is particularly advantageous, the first camera and the second camera acting as a stereo camera when the first camera and the second camera are different in at least one additional camera property as an alternative or in addition to the camera property of light sensitivity, because in this way the device is expanded by one additional special property which is particularly suitable for certain applications to be implemented and thus may be utilized in an advantageous manner. For example, it is advantageous to design the first and second cameras to be different with regard to the camera property of horizontal geometric resolution, e.g., the first camera having a horizontal geometric resolution of 800 pixels and the second camera having a horizontal geometric resolution of 1600 pixels.

It may be advantageous if the driver assistance function of night vision support is ensured generally by the first camera, while at the same time the driver assistance function of traffic sign recognition is ensured generally by the second camera. It is advantageous here in particular that this preserves the cooperation of the first and second cameras as a stereo camera and the images of the cameras are accessible to stereoscopic image processing. It may be advantageous if the first and second cameras acting as a stereo camera ensure additional driver assistance functions such as object recognition.

It is also advantageous in particular if the device is configured in such a way that an image of the first camera and/or an image of the second camera is processed with respect to at least one image property, so that images of the first and second cameras are almost identical in this image property after processing because in this way simple stereoscopic processing is possible as in the case of a stereo camera having two identical cameras. This contributes to simple and rapid algorithms and thus to an inexpensive device. It is advantageous here in particular if the image property is a horizontal geometric resolution of the image and/or a vertical geometric resolution of the image and/or a gray-scale value resolution of the image and/or image brightness.

BRIEF DESCRIPTION OF THE DRAWINGS

The present invention is explained in greater detail below on the basis of the embodiments depicted in the figures.

DESCRIPTION OF EXAMPLE EMBODIMENTS

A device for a motor vehicle having at least one first camera and at least one second camera is proposed below, the first camera and the second camera acting as a stereo camera, the first camera and the second camera being different with respect to at least one camera property, in particular the fact that the light sensitivity of the first camera and the light sensitivity of the second camera are different. Furthermore, the device is configured in such a way that the driver assistance functions of night vision support and/or traffic sign recognition and/or object recognition and/or road boundary recognition and/or lane recognition and/or other functions are ensured.

Instead of two identical cameras of a stereo camera, two cameras which are different from one another with respect to at least one camera property or a combination of multiple camera properties are used in a stereo camera.

The stereo camera function is characterized in that a stereo camera has at least two cameras situated in a fixed relative relationship to one another. The two cameras preferably record generally the same scene, the ranges of vision of the two cameras overlapping at least partially. The optical axes of the two cameras of the stereo camera are preferably but not necessarily parallel. The alignment of the two cameras in relation to one another is known precisely, so that the alignment data are known due to minor manufacturing and/or installation tolerances and/or are obtained in a calibration step, e.g., during installation of the cameras in a motor vehicle. Alternatively or additionally, the alignment data are obtained on-line, i.e., during operation of the stereo camera, by comparison of images. Alternatively or additionally, the stereo camera function is characterized in that the image information of the at least one first camera and the at least one second camera is analyzed to acquire three-dimensional information, e.g., by triangulation. In the case of triangulation, three-dimensional information is obtained using the different angles of view of the two cameras.

Figure 1:
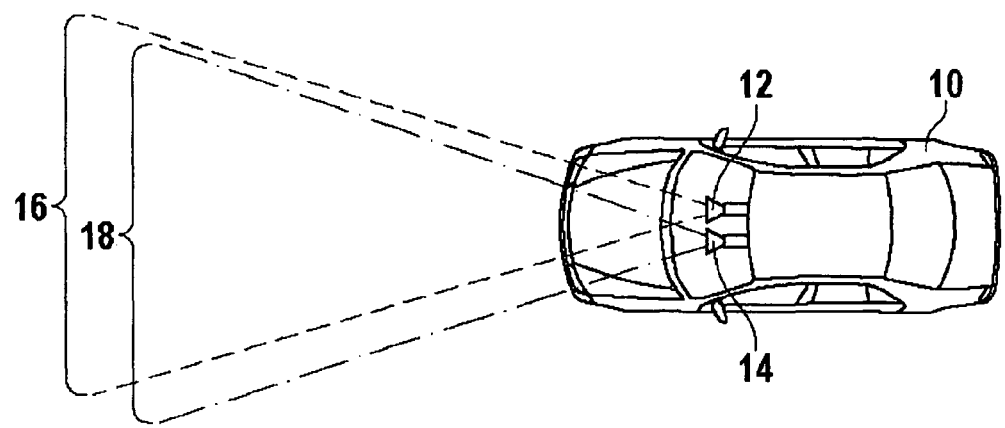
FIG. 1 shows an overview diagram.

FIG. 1 shows an overview diagram of the device in a vehicle 10 of the preferred exemplary embodiment, including a first camera 12 and a second camera 14. In the preferred exemplary embodiment, first camera 12 and second camera 14 are mounted on the windshield in the area of the interior rearview mirror of motor vehicle 10. Two cameras 12, 14 are aligned in the direction of travel, first camera 12 having a horizontal field of view 16 which is almost identical to horizontal field of view 18 of second camera 14. Furthermore, the optical axis of first camera 12 and the optical axis of second camera 14 are essentially parallel.

Figure 2:
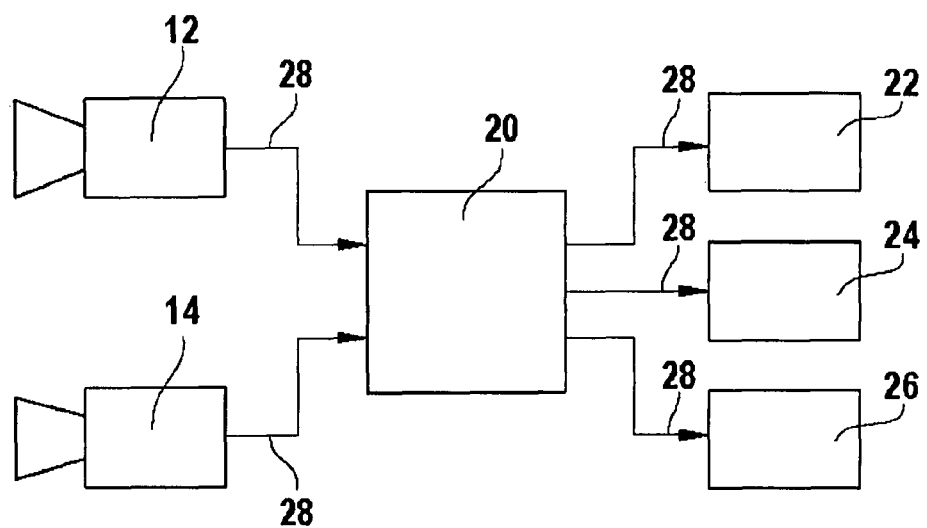
FIG. 2 shows a block diagram of the example device.

FIG. 2 shows a block diagram of the device of the preferred exemplary embodiment, including a first camera 12, a second camera 14, a processing unit 20 and visual, acoustic and haptic display units 22, 24, 26. First camera 12 is a black-and-white camera and includes a gray-scale value image sensor having a high light sensitivity and/or dark sensitivity, a pixel size of 8 µm with a horizontal geometric resolution of 800 pixels. The angle of view of the first camera equals ±20° in the preferred exemplary embodiment. Second camera 14 is a color camera and includes a high resolution color image sensor having a pixel size of 4 µm with a horizontal geometric resolution of 1600 pixels. In the preferred exemplary embodiment, the angle of view of the second camera equals ±35°. In the preferred exemplary embodiment, first camera 12 and second camera 14 are different in particular in the camera properties of light sensitivity, pixel size, horizontal geometric resolution and image scale. First camera 12 and second camera 14 are CMOS cameras. Alternatively or additionally, in one variant of the preferred exemplary embodiment, first camera 12 and/or second camera 14 are designed as CCD cameras or with another image sensor technology. The image data of both cameras 12, 14 are sent over signal lines 28 to processing unit 20. Processing unit 20 processes the image data and, in the preferred exemplary embodiment, provides the driver assistance functions of night vision support, traffic sign recognition and object recognition. Over additional signal lines 28, signals of processing unit 20 are transmitted over signal lines 28 to a visual display unit 22, an acoustic display unit 24 and a haptic display unit 26. The signals are transmitted electrically and/or optically and/or by wireless transmission over signal lines 28. Alternatively or additionally, signal line 28 is designed as a bus. Processing in processing unit 20 is implemented by programs or program steps in a microprocessor and/or by a programmable logic. To make available the driver assistance function of night vision support, processing unit 20 processes the image data of first camera 12 which has the properties listed below for this purpose. First camera 12 has good contrast resolution in the dark combined with a high dynamic range. From the image data of first camera 12, processing unit 20 copies a central image detail with a width of 440 pixels, processes the image detail and sends the reprocessed image detail to visual display unit 22. In the preferred exemplary embodiment, visual display unit 22 is a heads-up display, displaying the image detail to the driver of the vehicle via the windshield. In a variant of the preferred exemplary embodiment, the image detail is displayed to the driver by a display, in particular an LCD display, as visual display unit 22. To provide the driver assistance function of traffic sign recognition, processing unit 20 processes the image data of second camera 14, which has the properties for this as listed below. Second camera 14 is a color camera for creating a color image. Second camera 14 additionally has a high glare resistance. Algorithms for traffic sign recognition are implemented in processing unit 20. In the preferred exemplary embodiment, a rough classification of traffic signs is performed by color segmentation and finally recognition of traffic signs is performed by pattern comparison. The significance of the traffic sign is then ascertained. For example, recognition of a traffic sign representing a speed limit of 80 km/h results in processing unit 20 comparing the instantaneous speed of the vehicle with the speed limit and, if the speed is exceeded, transmitting signals over signal lines 28 to acoustic display unit 24, e.g., a loudspeaker, and haptic display unit 26 to warn the driver both acoustically and haptically. Furthermore, the driver is informed that the speed is above the limit and is being limited via the visual display unit 22 by displaying a traffic sign. To supply the driver assistance function of object recognition, processing unit 20 processes the image data of first camera 12 and second camera 14. Processing unit 20 therefore copies the image data of second camera 14, the processing unit at the same time performing a reduction of the horizontal image resolution and converting the color values of the color image into gray-scale values. The resulting image and the image of first camera 12 are supplied to stereo algorithms for object recognition in processing unit 20. For example, in the preferred exemplary embodiment, a lane departure warning is implemented. In the preferred embodiment, monitoring is performed on the basis of detected objects such as guide posts and/or streetcar markings to ascertain whether the vehicle is leaving the lane. If it is detected that the vehicle is leaving the lane, processing unit 20 warns the driver via acoustic display unit 24. The driver assistance function of object recognition is thus based on a stereo camera having a horizontal beam angle of ±20°.

In the case of digital cameras, light sensitivity is understood to be the light sensitivity of the image sensor (image converter), light sensitivity being given in comparison with the sensitivity of a chemical film. In the case of chemical film, the sensitivity is characterized using ISO values. ISO is an abbreviation for International Standard Organization. Conventional ISO sensitivity values range from ISO 25 to ISO 6400. At a low ISO setting, an image sensor needs comparatively more light to create an image than at a higher ISO setting. Doubling the ISO value or reducing it by one-half results in halving and/or doubling of the exposure, respectively. In contrast with film, image converters in general have a fixed sensitivity but a higher sensitivity may be achieved by amplification of the image signal at the expense of greater image graininess. Alternatively or additionally, a higher sensitivity is achieved by increasing the integration time (integration time corresponds to exposure time with chemical film). An increase in integration time may be achieved at the expense of the maximal image repetition rate and/or a less sharp image of movement. In the preferred exemplary embodiment, the higher light sensitivity of the first camera is achieved in comparison with the second camera by a different type of image sensor which has a high sensitivity. In a variant of the preferred exemplary embodiment, the same type of image sensor is used for the first camera and the second camera, the light sensitivity of the first camera being achieved by signal amplification, e.g., by increasing the gain of the image sensor.

In another variant of the preferred exemplary embodiment, the spectral sensitivity of the at least one first camera differs from that of the at least one second camera. The at least one first camera is preferably sensitive in the near infrared and/or in the visible and/or in both the visible and the near infrared ranges, the second camera being sensitive in the near infrared and/or in the visible and/or in both the visible and the near infrared ranges. Alternatively or additionally, at least one of the cameras is a color camera. The three basic variants mentioned above are embodied with one camera each and combined with the second camera, also having one of the aforementioned variants.

In one variant of the preferred exemplary embodiment, the first camera and the second camera are different with respect to at least one camera property, at least one additional camera property being a focal width of the lens and/or the aperture of the lens and/or the coating on the lens and/or the optical filter of the camera, e.g., an optical filter permanently integrated into the camera and/or the lens casing and/or the image sensor technology, e.g., CMOS or CCD and/or the pixel size and/or pixel geometry and/or horizontal geometric resolution and/or vertical geometric resolution and/or the resolution of the camera interface, i.e., the digital interface (bit depth) and/or the exposure parameters such as the gain and/or offset and/or integration time and/or image rate and/or spectral sensitivity and/or spectral sensitivity of individual color channels. Alternatively or additionally, in one variant of the preferred exemplary embodiment, the orientation of the camera in the vehicle is different, so that the optical axis of the first camera and the optical axis of the second camera are not parallel.

What is claimed is:

1. A device for a motor vehicle, comprising:
    a first camera and a second camera, wherein the first camera and the second camera are configured to at least one of (a) function as a stereo camera for at least a part of a recording of each of the first and second cameras to be simultaneously of a same scene, and (b) produce different images for a same imaging stimulus; and
    a processor configured to:
        perform a traffic sign recognition function based on color values of a color image obtained from the first camera and without regard to output of the second camera;
        perform a night vision support function based on an image obtained from the second camera and without regard to output of the first camera;
        convert the color image obtained from the first camera into a grayscale image; and
        perform a driver assistance function, that includes at least one of object recognition, carriageway edge recognition, and lane recognition, based on a combination of the grayscale image and the image obtained from the second camera.

2. The device as recited in claim 1, wherein the first camera and the second camera are configured to produce different images for the same imaging stimulus.

3. The device as recited in claim 1, wherein the first camera and the second camera are configured to function as the stereo camera for the at least the part of the recording of each of the first and second cameras to be simultaneously of a same scene.

4. The device as recited in claim 2, wherein a light sensitivity of the first camera is higher than a light sensitivity of the second camera.

5. The device as recited in claim 2, wherein the second camera is a black-and-white camera.

6. The device as recited in claim 2, wherein the first and second cameras differ from each other with respect to at least one of a focal width of a lens, an aperture of a lens, a coating on a lens, and an optical filter of the camera.

7. The device as recited in claim 2, wherein the first and second cameras differ with respect to at least one of an image sensor technology, a spectral sensitivity, and a spectral sensitivity of at least one color channel.

8. The device as recited in claim 2, wherein the first and second cameras differ from each other with respect to at least one of a resolution of the camera interface, at least one exposure parameter, and an image rate.

9. The device as recited in claim 2, wherein the device is configured in such a way that at least one of an image of the first camera and an image of the second camera is processed with regard to at least one image property so that images of the first and second cameras are almost the same with respect to the at least one image property after processing.

10. The device as recited in claim 9, wherein the image property is at least one of a horizontal geometric resolution of the image, a vertical geometric resolution of the image, a gray-scale value resolution of the image, and an image brightness.

11. The device as recited in claim 2, wherein the first and second cameras differ from each other with respect to at least one of a pixel size, a pixel geometry, a horizontal geometric resolution, and a vertical geometric resolution.

12. The device as recited in claim 1, wherein the second camera is not adapted for producing color images.

* * * * *